US010791047B2

(12) United States Patent
Stefanidis et al.

(10) Patent No.: US 10,791,047 B2
(45) Date of Patent: Sep. 29, 2020

(54) AUTOMATED NETWORK NAVIGATION

(71) Applicant: Disney Enterprises, Inc., Burbank, CA (US)

(72) Inventors: Efthimis Stefanidis, Douglaston, NY (US); Vladislav Feldman, Manhasset Hills, NY (US); Michael J. Strein, Bohemia, NY (US); Craig L. Beardsley, Chicago, IL (US)

(73) Assignee: Disney Enterprise Inc., Burbank, CA (US)

(*) Notice: Subject to any disclaimer, the term of this patent is extended or adjusted under 35 U.S.C. 154(b) by 63 days.

(21) Appl. No.: 15/898,949

(22) Filed: Feb. 19, 2018

(65) Prior Publication Data

US 2019/0260668 A1 Aug. 22, 2019

(51) Int. Cl.

*G06F 15/173* (2006.01)
*H04L 12/721* (2013.01)
*H04L 12/26* (2006.01)
*H04L 12/771* (2013.01)

(52) U.S. Cl.

CPC .......... *H04L 45/14* (2013.01); *H04L 43/0852* (2013.01); *H04L 43/16* (2013.01); *H04L 43/50* (2013.01); *H04L 45/56* (2013.01)

(58) Field of Classification Search

CPC ............................ H04L 45/14; H04L 43/0852
USPC .......................................................... 709/241
See application file for complete search history.

(56) References Cited

U.S. PATENT DOCUMENTS 7,822,801 B2 * 10/2010 Zhao ...................... G06Q 10/10 709/201
8,615,652 B2 * 12/2013 Redmond ......... H04L 29/06027 713/153
8,832,245 B2 * 9/2014 Karasaridis ......... H04L 61/1511 709/218
9,712,381 B1 * 7/2017 Emanuel ............. H04L 41/0677
10,305,782 B2 * 5/2019 Inamdar ................ H04L 47/122
10,313,225 B1 * 6/2019 Shevade ................. H04L 41/00
2003/0204619 A1 * 10/2003 Bays ....................... H04L 43/10 709/238
2004/0088431 A1 * 5/2004 Carter ..................... H04L 45/02 709/240
2007/0083727 A1 * 4/2007 Johnston ............... G06F 3/0613 711/170

(Continued)

*Primary Examiner* — Anthony Mejia
(74) *Attorney, Agent, or Firm* — Farjami & Farjami LLP

(57) ABSTRACT

A network navigation system includes a computing platform having a hardware processor and a system memory storing a routing software code, and communicatively coupled to multiple hardware nodes of a communication network. The hardware processor executes the routing software code to monitor performance data for each hardware node, identify a network destination for a content stream, identify a source hardware node for providing source content of the content stream based on the performance data, and identify hardware transmission nodes for delivery of the content stream based on the performance data. The source and transmission nodes determine a first network route for delivery of the content stream. The routing software code also receives test data for the first network route during delivery of the content stream, and determines a second network route for delivery of the content stream if the test data fails to meet a predetermined test standard.

14 Claims, 3 Drawing Sheets

(56) References Cited

U.S. PATENT DOCUMENTS

2007/0153782 A1* 7/2007 Fletcher .............. H04L 61/2567 370/389
2007/0268836 A1* 11/2007 Byun ...................... H04L 43/00 370/252
2009/0086643 A1* 4/2009 Kotrla ..................... H04L 43/16 370/248
2010/0138921 A1* 6/2010 Na ...................... H04L 63/1458 726/22
2012/0179835 A1* 7/2012 Morris ................... H04N 7/181 709/238
2012/0254396 A1* 10/2012 Prahalad ............. H04L 43/0817 709/224
2013/0042021 A1* 2/2013 Hajiaghayi ......... H04L 67/2842 709/241
2013/0326133 A1* 12/2013 Lee ..................... G06F 12/0875 711/108
2015/0032871 A1* 1/2015 Allan .................... H04L 47/125 709/223
2016/0192029 A1* 6/2016 Bergstrom ......... H04N 21/6125 725/109

* cited by examiner 136b
136a
132
132
110
130
132
Computing Platform 112
Hardware Processor
114
104
140
Content Distribution System
Routing Software Code
118
120
Memory 116
106
108
132
144
140
132
134
142b
134c
134a
142b
142a
134d
142a
142b
142b
134b
134f
134e
142a
Network 130
142b
144
100
108
108
132
132
Content Stream Destination
Content Stream Destination
138a
138b

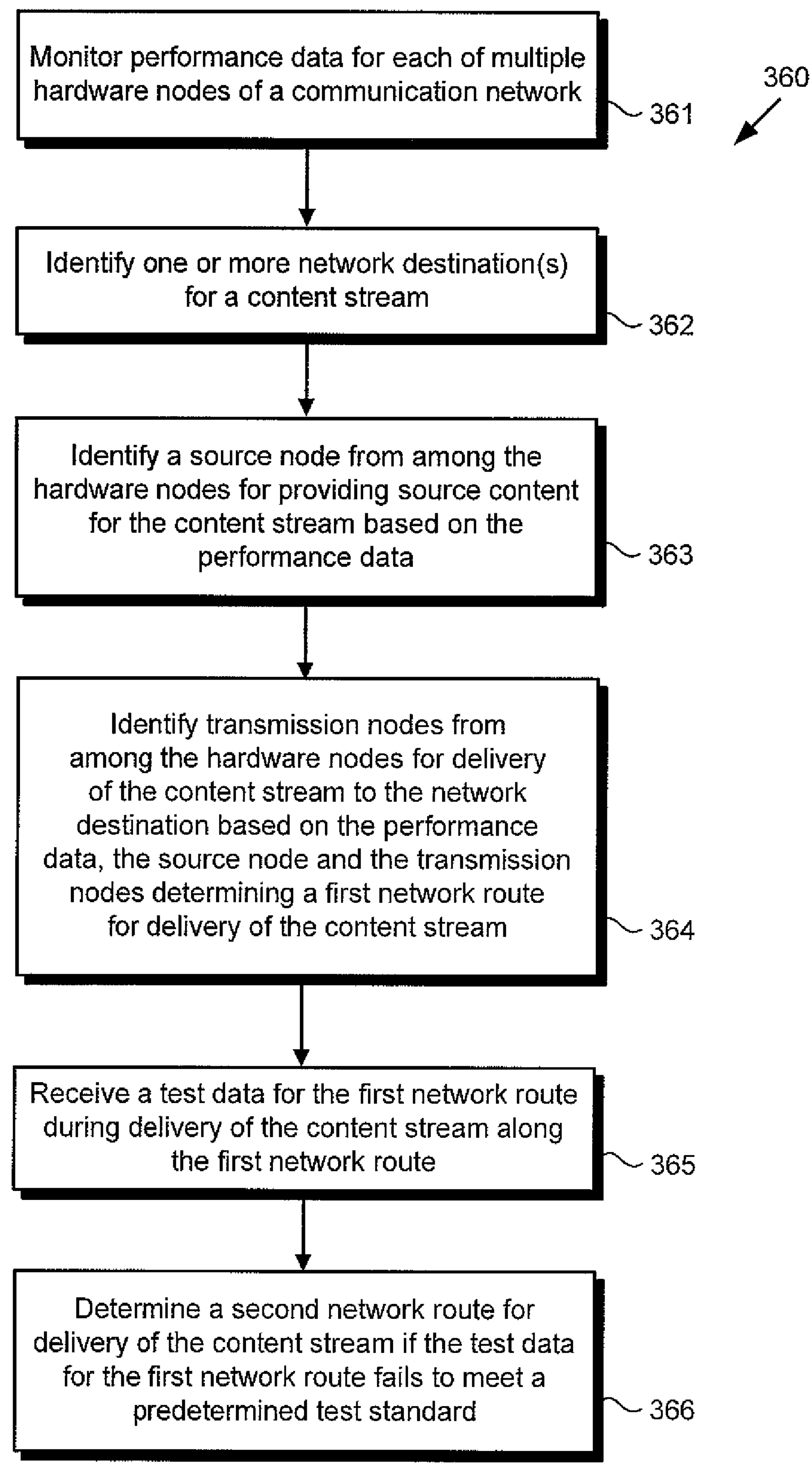
Fig. 3
360
Monitor performance data for each of multiple hardware nodes of a communication network
361
Identify one or more network destination(s) for a content stream
362
Identify a source node from among the hardware nodes for providing source content for the content stream based on the performance data
363
Identify transmission nodes from among the hardware nodes for delivery of the content stream to the network destination based on the performance data, the source node and the transmission nodes determining a first network route for delivery of the content stream
364
Receive a test data for the first network route during delivery of the content stream along the first network route
365
Determine a second network route for delivery of the content stream if the test data for the first network route fails to meet a predetermined test standard
366

AUTOMATED NETWORK NAVIGATION

BACKGROUND

As the systems designed to distribute various forms of media content, including video, migrate to modern communication networks such as the Internet, quality control and delivery assurance processes developed for use in a traditional broadcast environment may continue to be relied upon. In the case of video, for instance, traditional video distribution systems were typically designed for fault tolerance, and may utilize redundant sources of video content and redundant distribution paths. In addition, each system component for performing video processing along the distribution path may be replicated one or more times to ensure the availability of backups.

The distribution of video over a communication network such as the Internet introduces additional layers of complexity, however. For example, sources of video content, the destinations for that video content, and the resources included in the paths utilized for distribution of the video content may be numerous, diverse, and are often remote from one another. Consequently, reliance on traditional video distribution processes and controls can prove undesirably costly and inefficient with respect to resource allocation when applied to distribution of content over the Internet or other wide area network.

SUMMARY

There are provided automated network navigation systems and methods for use by such systems, substantially as shown in and/or described in connection with at least one of the figures, and as set forth more completely in the claims.

BRIEF DESCRIPTION OF THE DRAWINGS

FIG. 3 shows a flowchart presenting an exemplary method for performing automated network navigation, according to one implementation.

DETAILED DESCRIPTION

Figure 1:
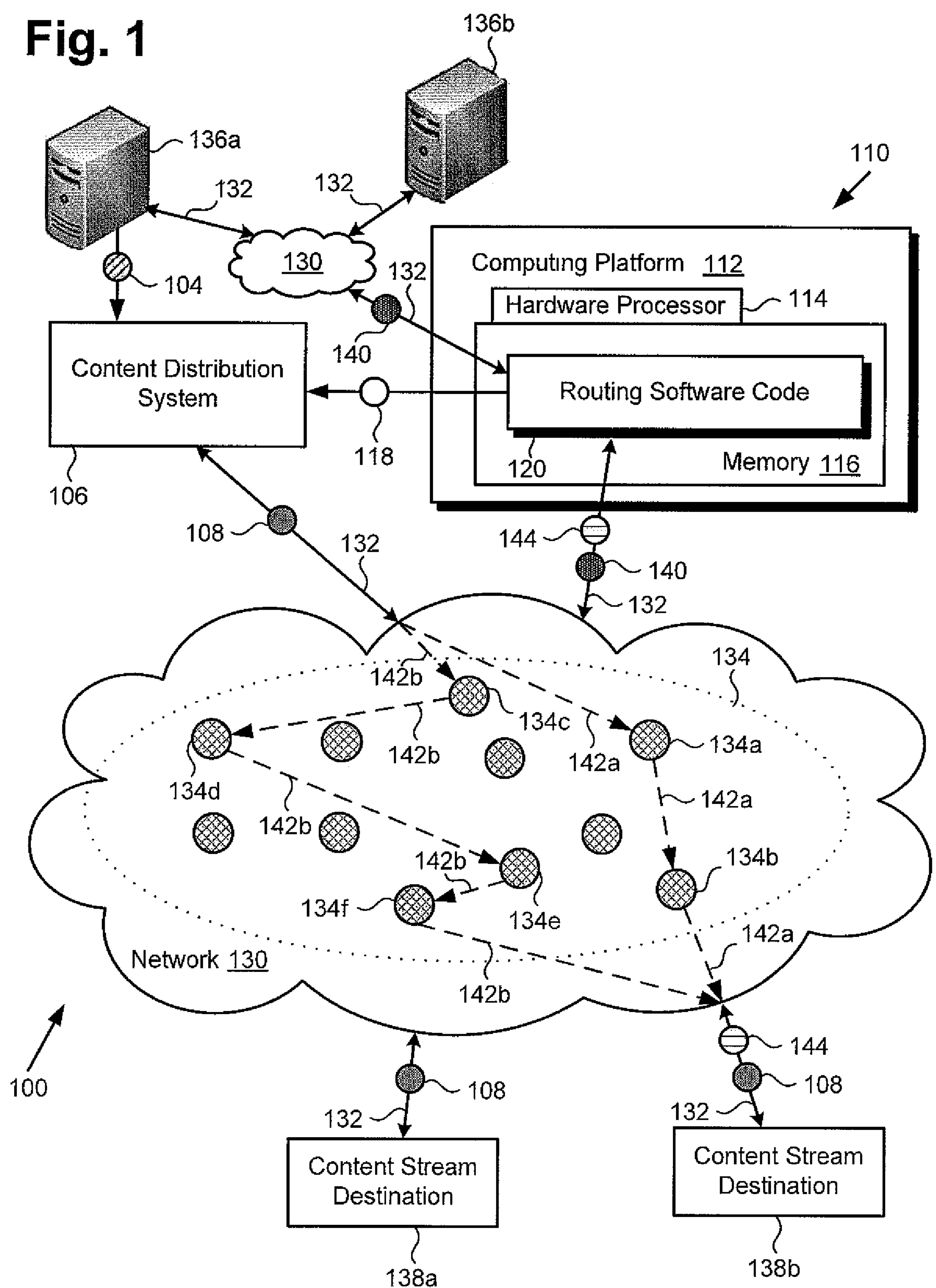
FIG. 1 shows a diagram of an exemplary network navigation system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a network navigation solution that overcomes the drawbacks and deficiencies in the conventional art. The present network navigation solution can be implemented as an automated solution capable of identifying a substantially optimal route across a communication network for delivery of a content stream. By monitoring performance data for each hardware node of the network and identifying a route for delivery of the content stream based on the performance data, the present network navigation solution can provide routing that is substantially optimal relative to present network conditions. Moreover, by rerouting delivery of the content stream when test data reveals that the original route is failing to deliver the content reliably, or at an acceptable standard of quality, the present network navigation solution automatically adapts to changes in network conditions. As a result, the present network navigation solution advantageously provides robust network routing that is resilient to individual hardware or software component failures, without the cost or inefficiency imposed by traditional content distribution processes.

FIG. 1 shows a diagram of an exemplary automated network navigation system, according to one implementation. As shown in FIG. 1, network navigation system 110 includes computing platform 112 having hardware processor 114, and system memory 116 implemented as a non-transitory storage device. According to the present exemplary implementation, system memory 116 stores routing software code 120 configured to identify a substantially optimal network route for delivery of content stream 108.

As further shown in FIG. 1, network navigation system 110 is implemented within content distribution environment 100 including communication network 130 having network communication links 132 and multiple hardware nodes 134, 136*a*, and 136*b*. In addition, FIG. 1 shows content distribution system 106 receiving source content 104 and providing content stream 108 including source content 104, content stream destinations 138*a* and 138*b*, performance data 140, test data 144, and routing data 118 generated by routing software code 120.

Hardware nodes 134 of communication network 130 are implemented as transmission nodes (hereinafter "transmission nodes 134") including exemplary transmission nodes 134*a* and 134*b* providing a portion of first network route 142*a*, and transmission nodes 134*c*, 134*d*, 134*e*, and 134*f* (hereinafter "transmission nodes 134*c*-134*f*") providing a portion of second network route 142*b*. Hardware nodes 136*a* and 136*b* are implemented as potential source nodes (hereinafter "source node 136*a*" and "source node 136*b*") of source content 104 included in content stream 108.

It is noted that FIG. 1 depicts two instantiations of communication network 130 to show that computing platform 112 of network navigation system 110 is communicatively coupled to source nodes 136*a* and 136*b*, as well as to transmission nodes 134 via the same communication network 130. Thus, for the purposes of the present application, source nodes 136*a* and 136*b*, like transmission nodes 134, are defined as hardware nodes of communication network 130.

Source nodes 136*a* and 136*b* may take the form of content servers configured to provide source content 104 in the form of audio-visual content, such as television (TV) program content or movie content, for example. Transmission nodes 134 may be implemented using a wide variety of diverse hardware devices. Exemplary devices for implementing transmission nodes 134 include switches, routers, gateways, bridges, repeaters, and proxy servers, to name a few. It is noted that transmission nodes 134 may be physically remote from one another, as well as from source nodes 136*a* and 136*b* and content destinations 138*a* and 138*b*. For example, transmission nodes 134 may be located hundreds or thousands of miles apart from one another.

In some implementations, computing platform 112 of network navigation system 110 may correspond to one or more web servers, accessible over a packet-switched network such as the Internet, for example. Alternatively, computing platform 112 of network navigation system 110 may correspond to one or more computer servers supporting a private WAN, or included in another type of limited distribution network. That is to say, in some implementations, communication network 130 may include a public network such as the Internet, while in some implementations communication network 130 may include a private WAN or other limited distribution network.

According to some implementations, network navigation system 110 may be integrated with content distribution system 106 so as to function as a feature of content distribution system 106. For example, content distribution system 106 may be a cloud based and substantially automated system for distributing content, such as source content 104, over communication network 130.

It is noted that, although the present application refers to routing software code 120 as being stored in system memory 116 for conceptual clarity, more generally, system memory 116 may take the form of any computer-readable non-transitory storage medium. The expression "computer-readable non-transitory storage medium," as used in the present application, refers to any medium, excluding a carrier wave or other transitory signal that provides instructions to hardware processor 114 of computing platform 112. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Figure 2:
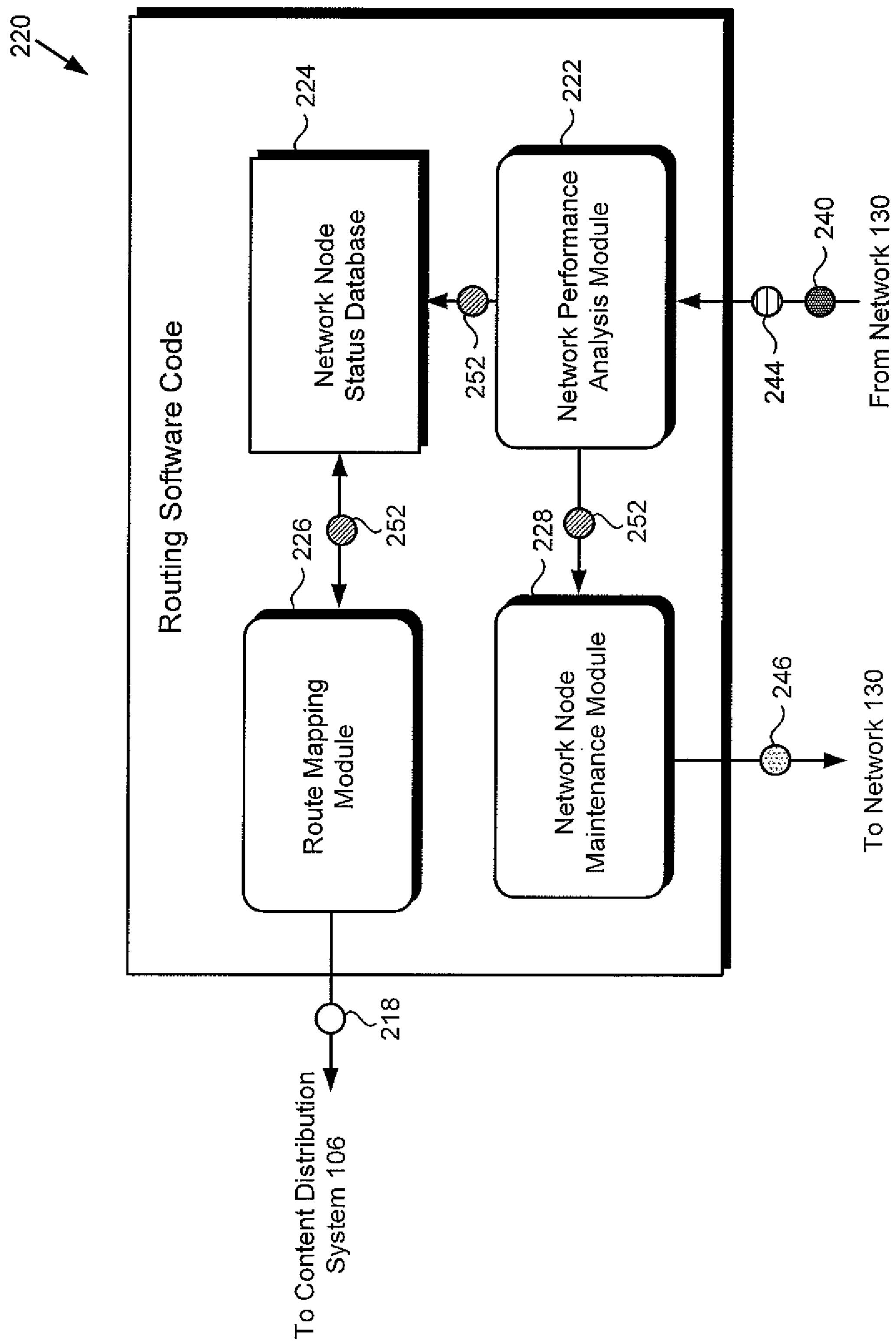
FIG. 2 shows an exemplary diagram of a routing software code suitable for execution by a hardware processor of the network navigation system of FIG. 1, according to one implementation.

FIG. 2 shows a more detailed diagram of exemplary routing software code 220 suitable for execution by hardware processor 114 of network navigation system 110, in FIG. 1, according to one implementation. As shown in FIG. 2, routing software code 220 may include network performance analysis module 222, network node status database 224, route mapping module 226, and in some implementations, network node maintenance module 228. In addition, FIG. 2 shows performance data 240 and test data 244 received via communication network 130, routing data 218 provided to content distribution system 106, and maintenance instructions 246 optionally provided to one or more hardware nodes of communication network 130 by network node maintenance module 228.

Also shown in FIG. 2 is performance analysis data 252 generated by network performance analysis module 222 of routing software code 220. As shown in FIG. 2, performance analysis data 252 may be stored in network node status database 224 for retrieval by route mapping module 226. Furthermore, in some implementations, network performance analysis module 222 may transfer performance analysis data 252 to network node maintenance module 228. In those implementations, network node maintenance module 228 may be configured to act on performance analysis data 252 by outputting maintenance instructions 246 to one or more of source nodes 136*a* and 136*b* and/or transmission nodes 134, in FIG. 1.

Performance data 240, test data 244, and routing data 218, in FIG. 2, correspond respectively in general to performance data 140, test data 144, and routing data 118, in FIG. 1, and those corresponding features may share any of the characteristics attributed to either corresponding feature by the present disclosure. Moreover, routing software code 220 corresponds in general to routing software code 120, in FIG. 1, and those corresponding features may share any of the characteristics attributed to either corresponding feature by the present disclosure. Thus, like routing software code 220, routing software code 120 may include features corresponding to network performance analysis module 222, network node status database 224, route mapping module 226, and in some implementations, to network node maintenance module 228 as well.

The functionality of routing software code 120/220 will be further described by reference to FIG. 3 in combination with FIGS. 1 and 2. FIG. 3 shows flowchart 360 presenting an exemplary method for use by a system, such as network navigation system 110, in FIG. 1, for performing automated network navigation. With respect to the method outlined in FIG. 3, it is noted that certain details and features have been left out of flowchart 360 in order not to obscure the discussion of the inventive features in the present application.

Referring now to FIG. 3 in combination with FIGS. 1 and 2, flowchart 360 begins with monitoring performance data 140/240 for each of multiple hardware nodes, i.e., source nodes 136*a* and 136*b* and transmission nodes 134, of communication network 130 (action 361). Monitoring of performance data 140/240 for source nodes 136*a* and 136*b* and transmission nodes 134 may be performed by routing software code 120/220 of network navigation system 110, executed by hardware processor 114, and using network performance analysis module 222. As noted above, source nodes 136*a* and 136*b* may take the form of content servers providing source content 104 in the form of audio-visual content, while transmission nodes 134 may be implemented as switches, routers, gateways, bridges, repeaters, and/or proxy servers, for example.

Performance data 140/240 may take a number of forms. For example, in use cases in which source nodes 136*a* and 136*b* are content servers, performance data 140/240 may include data provided by a server health module of each of source nodes 136*a* and 136*b*. In use cases in which one or more of transmission nodes 134 are routers, for instance, performance data 140/240 may include data describing the health and traffic of each router port. Alternatively, or in addition, performance data 140/240 may include Simple Network Management Protocol (SNMP) traps, as known in the art.

Network performance analysis module 222 of routing software code 120/220 may be configured to process performance data 140/240 and to generator performance analysis data 252 for each of the hardware nodes of communication network 130. Performance analysis data for each of the hardware nodes of communication network 130 may be transferred to network node status database 224 by network performance analysis module 222. Moreover, network performance analysis module 222 may be configured to poll the hardware nodes of communication network 130 substantially continuously, and to update performance analysis data 252 as necessary. Consequently, performance analysis data 252 stored in network node status database 224 can provide the present performance or health status of each hardware node of communication network 130 at substantially all times.

Flowchart 360 continues with identifying one or more network destinations, i.e., content stream destinations 138*a* and 138*b*, for content stream 108 (action 362). In some implementations, content stream 108 may include one or more Internet Protocol (IP) unicast content streams, each directed to a single destination, i.e., one of content stream destinations 138*a* and 138*b*. However, in other implementations, as shown in FIG. 1, content stream 108 may be an IP multicast content stream for distribution to multiple destinations.

Content stream destinations 138*a* and 138*b* may take a number of alternative forms, and may be implemented as hardware or software. For example, either or both of content stream destinations 138*a* and 138*b* may be implemented as virtual transponders in a regional Meet Me Room. As other examples, either or both of content stream destinations 138*a* and 138*b* may take the form of a Digital Multi-channel Video Programming Distributor (DMVPD) headend, or a local or regional content delivery network (CDN). Identification of one or more of content stream destinations 138*a* and 138*b* as a network destination of content stream 108 may be performed by routing software code 120/220 of network navigation system 110, executed by hardware processor 114, and using route mapping module 226.

Flowchart 360 continues with identifying one of source nodes 136*a* and 136*b* of communication network 130 as a source node for providing source content 104 for content stream 108 based on performance data 140/240 (action 363). As shown in FIG. 1, according to the present exemplary implementation, source node 136*a* has been identified as the source node for source content 104. Identification of source node 136*a* as the source node for providing source content 104 for content stream 108 may be performed by route mapping module 226 of routing software code 120/220, executed by hardware processor 114, and using performance analysis data 252 generated based on performance data 140/240.

Where each of source nodes 136*a* and 136*b* is a potential source for providing source content 104 for content stream 108, identification of source node 136*a* rather than source node 136*b* to provide source content 104 may occur for any of several different reasons. For example performance data 140/240 may indicate that source node 136*b* is performing sub-optimally, or has suffered a performance fault.

It is noted that although content stream 108 may be an IP multicast content stream having multiple destinations, as stated above by reference to action 362, in the interests of conceptual clarity, the further actions outlined by flowchart 360 and discussed below will be described as though content stream 108 is directed to a single network destination, i.e., content stream destination 138*b*. Bearing that proviso in mind, flowchart 360 continues with identifying transmission nodes 134*a* and 134*b* for delivery of content stream 108 to content stream destination 138*b* based on performance data 140/240 (action 364), where source node 136*a* and transmission nodes 134*a* and 134*b* determine first network route 142*a* for delivery of content stream 108.

Identification of transmission nodes 134*a* and 134*b* for delivery of content stream 108 to content stream destination 138*b* may be performed by routing software code 120/220, executed by hardware processor 114, and using performance analysis data 252 generated based on performance data 140/240. First network route 142*a* determined by source node 136*a* and transmission nodes 134*a* and 134*b* may be included in routing data 118/218 generated by route mapping module 226 of routing software code 120/220.

Identification of transmission nodes 134*a* and 134*b* for delivery of content stream 108 to content stream destination 138*b* from among transmission nodes 134 may occur for any of several different reasons. For example performance data 140/240 may indicate that transmission nodes 134 other than transmission nodes 134*a* and 134*b* are performing sub-optimally or are offline. Alternatively, or in addition, first network route 142*a* may represent a shortest path through communication network 130, either with respect to the number of transmission nodes on first network route 130, or with respect to a latency imposed by first network route 142*a*. Regardless of the particular criteria being applied, first network route 142*a* is identified as the substantially optimal path through communication network 130 for delivery of content stream 108 to content stream destination 138*b* based on those criteria.

Routing data 118/218 identifying first network route 142*a* may be utilized by content distribution system 106 to deliver content stream 108 to content stream destination 138*b* along first network route 142*a*. As noted above, in some implementations, network navigation system 110 may be integrated with content distribution system 106. In those implementations, routing data 118/218 is generated as a data resource existing in a system memory of content distribution system 106, which may be a distributed memory including system memory. 116 of computing platform 112, and accessible by content distribution system 106.

Flowchart 360 continues with receiving test data 144/244 for first network route 142*a* during delivery of content stream 108 along first network route 142*a* (action 365). Test data 144/244 may be received by routing software code 120/220, executed by hardware processor 114, during delivery of content stream 108 along first network route 142*a* by content distribution system 106. Test data 144/244 for first network route 142*a* may be generated at content stream destination 138*b*, and may be based on the quality of the content carried by content stream 108 when it is received at content stream destination 138*b* over first network route 142*a*. Test data 144/244 may be received by routing software code 120/220, executed by hardware processor 114 of network navigation system 110, from content stream destination 138*b*.

As noted above, content stream 108 may include audio-visual content. In those implementations, test data 144/244 may include one or more measures of the video quality of video included in content stream 108, such as the resolution or blur of the video received at content stream destination 138*b* over first network route 142*a*. In some implementations, content stream 108 may be a multi-channel content stream including a video channel carrying video content and an audio channel carrying audio content. In those implementations, test data 144/244 may include a measure of the alignment of the video content with the audio content, for example.

Flowchart 360 can conclude with determining second network route 142*b* for delivery of content stream 108 to content stream destination 138*b* if test data 144/244 for first network route 142*a* fails to meet a predetermined test standard (action 366). As noted above, test data 144/244 may include one or more measures of video quality, and/or a measure of the alignment of video and audio content carried by content stream 108. In those implementations, the predetermined standard against which test data 144/244 is compared may be a video quality standard and/or an alignment standard of the video content with the audio content.

The present condition of communication network 130, i.e., the present state of health or performance of its hardware nodes 136*a*, 136*b*, and 134 may be dynamic, and may change in significant ways subsequent to identification of first network route 142*a* as the substantially optimal path for delivery of content stream 108 to content stream destination 138*b*. For example, a hardware or software failure affecting one of transmission nodes 134*a* or 134*b*, a malfunction by one of those transmission nodes, or unanticipatedly heavy traffic through one of those transmission nodes may render first network route 142*a* less than optimal during delivery of content stream 108.

Where continued use of first network route 142*a* for delivery of content stream 108 to content stream destination 138*b* is identified as being undesirable based on test data 144/244, hardware processor 114 can execute routing software code 120/220 to determine second network route 142*b* for delivery of content stream 108 to content stream destination 138*b*. Like first network route 142*a*, second network route 142*b* may be determined by routing software code 120/220 based on performance data 140/240. Moreover, hardware processor 114 may execute routing software code 120/220 to determine second network route 142*b* automatically, i.e., as part of an automated process that does not require human participation, if test data 144/244 fails to meet the predetermined test standard.

According to the exemplary implementation shown in FIG. 1, second network route 142*b* retains source node 136*a*, but utilizes transmission nodes 134*c*-134*f* in lieu of transmission nodes 134*a* and 134*b* used in first network route 142*a*. Identification of transmission nodes 134*c*-134*f* for delivery of content stream 108 to content stream destination 138*b* may be based on any of the criteria discussed above by reference to identification of transmission nodes 134*a* and 134*b* of first network route 142*a*. Regardless of the particular criteria being applied, second network route 142*b* is determined to be the substantially optimal path for delivery of content stream 108 to content stream destination 138*b* based on those criteria and the changed condition of communication network 130 since identification of first network path 142*a* as the previously substantially optimal path.

Although not included in the outline provided by flowchart 360, in some implementations, hardware processor 114 may further execute routing software code 120/220 to modify the operation of one or more of the hardware nodes of communication network 130. For example, based on performance analysis data 252 generated based on performance data 140/240, network node maintenance module 228 may be configured to output maintenance instructions 246 to one or more of source nodes 136*a* and 136*b* and transmission nodes 134.

As a specific example, where one or more of source nodes 136*a* and 136*b* and/or transmission nodes 134 is in a standby or sleep mode, hardware processor 114 may execute network node maintenance module 228 of routing software code 120/220 to output maintenance instructions 246 to activate those hardware nodes. Alternatively, or in addition, where performance data 140/240 indicates that one or more of source nodes 136*a* and 136*b* and/or transmission nodes 134 is running dangerously hot, hardware processor 114 may execute network node maintenance module 228 to output maintenance instructions 246 to shut down operation of those hardware nodes.

Thus, the present application discloses a network navigation solution that can be implemented as an automated solution capable of identifying a substantially optimal route across a communication network for delivery of a content stream. By monitoring performance data for each hardware node of the network and identifying a route for delivery of the content stream based on the performance data, the present network navigation solution can provide routing that is substantially optimal relative to present network conditions. Moreover, by rerouting delivery of the content stream when test data reveals that the original route is failing to deliver the content reliably, or at an acceptable standard of quality, the present network navigation solution automatically adapts to changes in network conditions. As a result, the present network navigation solution advantageously provides robust network routing that is resilient to individual hardware or software component failures, without the cost or inefficiency imposed by traditional content distribution processes.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A network navigation system for delivering a first source content stored in each of a plurality of content servers to one or more network destinations via one or more of a plurality of transmission nodes, the network navigation system comprising:

- a computing platform communicatively coupled to a plurality of hardware nodes of a communication network, the plurality of hardware nodes including the plurality of content servers and the plurality of transmission nodes, the computing platform including a hardware processor and a system memory storing a routing software code;
- the hardware processor configured to execute the routing software code to:
  - monitor a performance data for each of the plurality of hardware nodes of the communication network;
  - identify a target network destination of the one or more network destinations for delivering the first source content thereto;
  - identify one of the plurality of content servers, based on the performance data, for providing the first source content therefrom to the target network destination;
  - identify the one or more of the plurality of transmission nodes, based on the performance data and the identified one of the plurality of content servers, to define a first network route for delivering the first source content from the identified one of the plurality of content servers to the target network destination;
  - receive a test data for the first network route during the delivering of the first source content via the first network route, wherein the first source content includes video content and audio content, and wherein the test data communicates a measure of an alignment of the video content with the audio content; and
  - determine a second network route for delivering the first source content when the measure of the alignment of the video content with the audio content fails to meet an alignment standard.

2. The network navigation system of claim 1, wherein the test data for the first network route is received from the target network destination.

3. The network navigation system of claim 1, wherein the first source content is delivered via an Internet Protocol (IP) multicast content stream.

4. The network navigation system of claim 1, wherein the first source content is delivered via at least one IP unicast content stream.

5. The network navigation system of claim 1, wherein the communication network is a private wide area network (WAN).

6. The network navigation system of claim 1, wherein the hardware processor is further configured to execute the routing software code to modify an operation of at least one of the plurality of hardware nodes based on the performance data.

7. The network navigation system of claim 1, wherein the hardware processor is further configured to execute the routing software code to shut down an operation of at least one of the plurality of hardware nodes based on the performance data.

8. A method for use by a network navigation system for delivering a first source content stored in each of a plurality of content servers to one or more network destinations via one or more of a plurality of transmission nodes, the network navigation system including a computing platform communicatively coupled to a plurality of hardware nodes of a communication network, the plurality of hardware nodes including the plurality of content servers and the plurality of transmission nodes, the computing platform including a hardware processor and a system memory storing a routing software code, the method comprising:

monitoring, using the hardware processor, a performance data for each of the plurality of hardware nodes of the communication network;

identifying, using the hardware processor, a target network destination of the one or more network destinations for delivering the first source content thereto;

identifying, using the hardware processor, one of the plurality of content servers, based on the performance data, for providing the first source content therefrom to the target network destination;

identifying, using the hardware processor, the one or more of the plurality of transmission nodes, based on the performance data and the identified one of the plurality of content servers, to define a first network route for delivering the first source content from the identified one of the plurality of content servers to the target network destination;

receiving, using the hardware processor, a test data for the first network route during the delivering of the first source content via the first network route, wherein the first source content includes video content and audio content, and wherein the test data communicates a measure of an alignment of the video content with the audio content; and determining, using the hardware processor, a second network route for delivering the first source content when the measure of the alignment of the video content with the audio content fails to meet an alignment standard.

9. The method of claim 8, wherein the test data for the first network route is received from the target network destination.

10. The method of claim 8, wherein the first source content is delivered via an Internet Protocol (IP) multicast content stream.

11. The method of claim 8, wherein the first source content is delivered via at least one IP unicast content stream.

12. The method of claim 8, wherein the communication network is a private wide area network (WAN).

13. The method of claim 8, further comprising modifying an operation of at least one of the plurality of hardware nodes based on the performance data.

14. The method of claim 8, further comprising shutting down an operation of at least one of the plurality of hardware nodes based on the performance data.

* * * * *